Jan. 31, 1939.  A. ANDERSON  2,145,330
THRESHING APPARATUS
Filed May 7, 1937  2 Sheets-Sheet 2

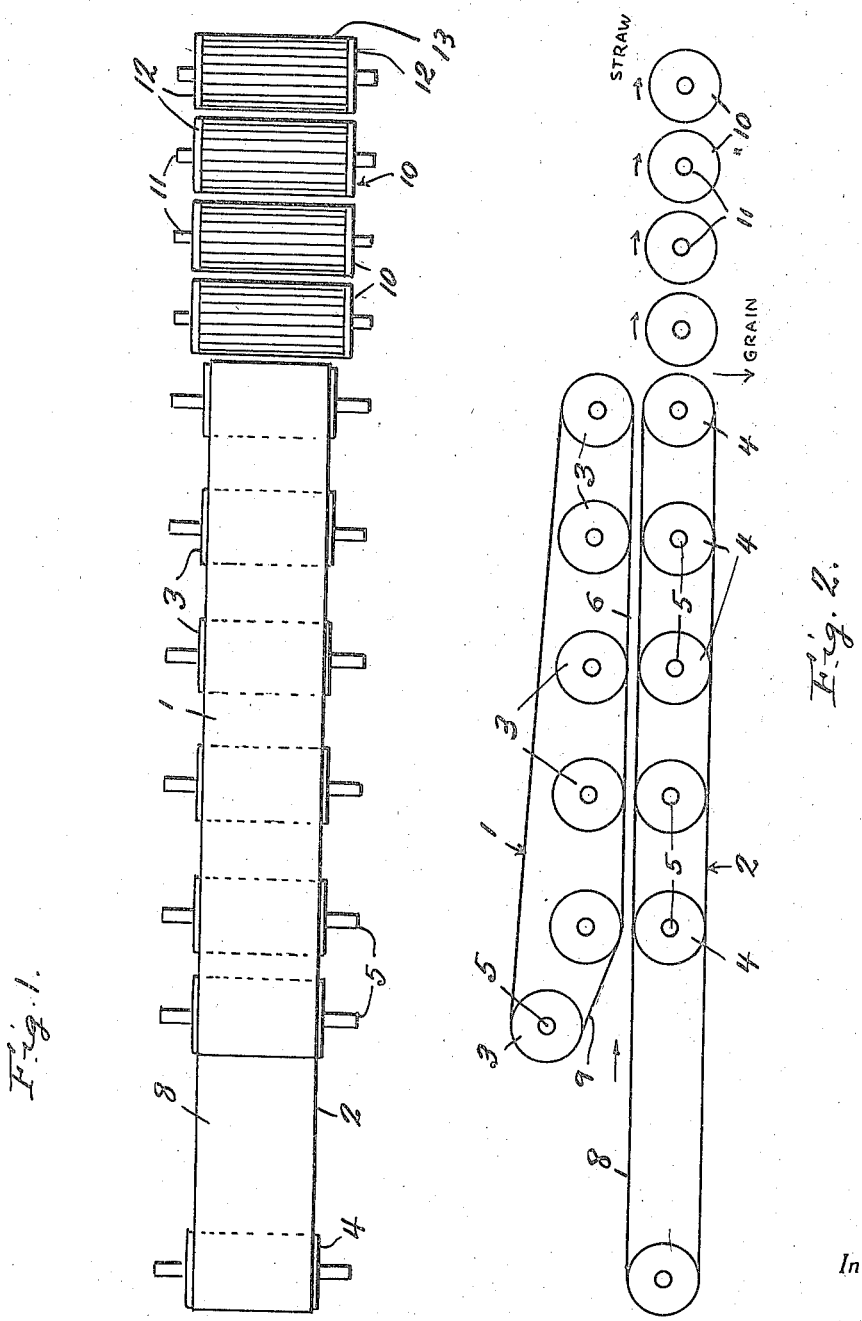

Inventor
August Anderson
By Clarence A. O'Brien
Hyman Berman
Attorneys

Patented Jan. 31, 1939

2,145,330

UNITED STATES PATENT OFFICE 2,145,330

THRESHING APPARATUS

August Anderson, Beulah, N. Dak.

Application May 7, 1937, Serial No. 141,351

2 Claims. (Cl. 130—23)

My invention relates to improvements in threshing apparatus for use in threshing grain.

The invention is designed with the particular end in view of providing a simply constructed threshing apparatus operative at a high speed to thresh by pressure exerted with a rubbing and rolling action during travel of the grain through the apparatus.

Another object is to provide apparatus of the character and for the purpose above set forth which is adapted to thoroughly thresh grain without the use of the usual concave, grates, racks and retarders, thereby providing a simplified mechanism and one which requires less power to operate.

Another object is to obviate cracking the grain by eliminating rotary metal parts between which the grain must pass.

To the accomplishment of the above, and subordinate objects presently appearing, a preferred embodiment of my invention has been illustrated in the accompanying drawings, set forth in detail in the following description, and defined in the claims appended hereto.

In said drawings:

Figure 1 is a view in top plan illustrating, diagrammatically, apparatus constructed in accordance with my invention.

Figure 2 is a view in side elevation.

Figure 3:
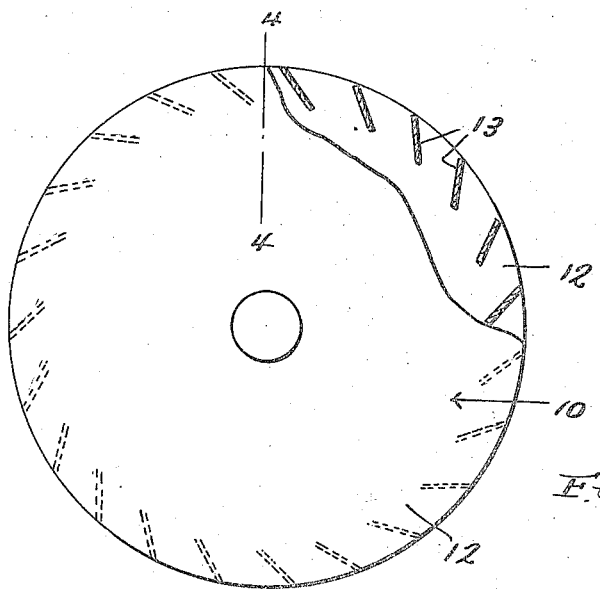
Figure 3 is a view in end elevation, partly broken away, of one of a plurality of separators forming part of the apparatus.
Figure 4:
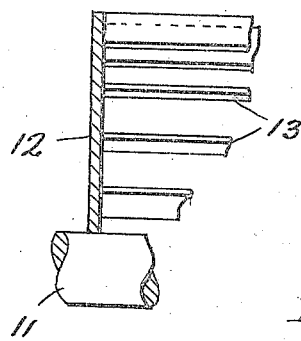
Figure 4 is a fragmentary view in transverse section taken on the line 4—4 of Figure 3.

Referring to the drawings by numerals, the basic elements of my invention, as illustrated, are upper and lower horizontally disposed endless belt conveyors 1 and 2, respectively, mounted in slightly spaced apart parallel relation throughout the greater part of their length on transversely disposed series of upper and lower rollers 3 and 4 rotatable about fixed axes 5. The rollers 3 and 4 are arranged to stretch and support the conveyors 1 and 2 in taut condition throughout their lengths to thereby provide opposed substantially taut upper and lower stretches 6 and 7 for receiving grain therebetween. The lower conveyor 2, at the forward end of the apparatus, extends beyond the upper conveyor 1 and provides a feed table stretch 8, and the upper conveyor 1 at said end of the apparatus is provided with an upwardly and forwardly inclined lower stretch 9 to facilitate the feed of the grain between the stretches 6 and 7. The conveyors 1 and 2 are designed to be driven in relatively opposite directions so that their opposed stretches 6 and 7 travel in the same direction, i. e., rearwardly of the apparatus and preferably at the same speed, although the speed of said conveyors may be varied relatively as occasion may require. The mechanism for driving the conveyors 1 and 2 may be of any suitable design, the precise details thereof being immaterial to the invention and the drive therefor not illustrated in the drawings.

At the rear end of the conveyors 1 and 2 is a series of drum-like rotary separators 10 spaced successively from the rear end of the lower conveyor 2. The separators 10 are mounted for rotation about fixed horizontal axes 11 disposed in the common plane of the axes 5 of the rollers 4. The separators 10 each comprise a pair of opposed end sections 12 and a plurality of longitudinally disposed slats 13 extending between the edges of said sections and spaced apart equidistantly and inclined from the radial in the direction, presently described, of rotation of the separator.

The separators are designed to be driven in the same direction as the lower conveyor 2 and preferably at the speed at which the straw travels through the conveyors. As in the case of the conveyors 1 and 2, the mechanism for driving said separators has not been illustrated in the drawings since the precise form of the mechanism utilized is immaterial to the present invention.

The described apparatus is designed to be enclosed, preferably from front to rear thereof, by any suitable means which need merely to be mentioned in passing.

Referring now to the operation, the grain on the stalks is fed onto the table stretch 8 to be pulled rearwardly between the opposed stretches 6 and 7 by the conveyors. During its passage through said stretches 6 and 7, the grain is subjected to yielding pressure thereby and rolled between said stretches, as will be manifest, whereby the grain proper is separated, or threshed, out of the stalk or straw. At the rear end of the lower conveyor 2, the straw is thrown thereby onto the tops of the separators 10 to be fed thereover by the rotary action of the latter and discharged from the last separator onto the ground, or a conveyor, (not shown) as the case may be. The grain proper from the conveyor 2 is discharged into the adjacent separator 10, being picked up by the slats 13 of the latter, to gravitate out of the bottom of said separator. The grain proper falling from the straw or stalks as the latter passes over the separators, falls into and through the latter out of the same. The slats 13 effect an upward beating action against the straw or stalks passing thereover, and thereby facilitate separation of the grain from the stalks or straw as will be clear. The slats 13 also function as baffles preventing the grain in the separators from being thrown broadcast, by centrifugal force, out of the sides and top of said separators.

The foregoing description will, it is believed, suffice to impart a clear understanding of my invention without further explanation, but it is to be understood that the present disclosure is illustrative rather than descriptive, and that right is herein reserved to modifications of details described in the foregoing, falling within the scope of the claims appended hereto.

What I claim is:

1. In a grain threshing apparatus, feeding and compressing means comprising a pair of upper and lower endless belt-like conveyors horizontally disposed and having opposed parallel stretches juxtaposed in slightly spaced apart relation for the passage of grain therethrough and yieldingly compressing said grain therebetween, said stretches travelling in the same direction to discharge the grain from one end of the lower stretch, and a battery of drum-like separators at said end of the lower stretch disposed in succession in the line of said stretch and rotating about horizontal axes in the direction of travel of said stretches and at substantially the speed at which the grain passes through said stretches with their upper peripheral portions in the plane of the lower stretch, whereby said discharged grain is fed forwardly over successive separators at substantially uniform speed, said separators each comprising a pair of circular end sections, and a plurality of circumferentially spaced slats extending between the edges of said sections whereby the grain passing over the separators is subjected to an upward beating and separating action, said slats inclining from said edges inwardly of the sections in the direction of rotation of the separators, thereby preventing grain falling into the separators from being thrown broadcast therefrom under rotation thereof.

2. In a grain threshing apparatus, feeding and compressing means comprising a pair of upper and lower endless belt-like conveyors horizontally disposed and having opposed parallel stretches juxtaposed in slightly spaced apart relation for the passage of grain therethrough and yieldingly compressing said grain therebetween, said stretches travelling in the same direction to discharge the grain from one end of the lower stretch, and a battery of drum-like separators at said end of the lower stretch disposed in succession in the line of said stretch and rotating about horizontal axes in the direction of travel of said stretches and at substantially the speed at which the grain passes through said stretches with their upper peripheral portions in the plane of the lower stretch, whereby said discharged grain is fed forwardly over successive separators at substantially uniform speed, said separators each comprising a pair of circular end sections, and a plurality of circumferentially spaced slats extending between the edges of said sections whereby the grain passing over the separators is subjected to an upward beating and separating action, said slats inclining from said edges inwardly of the sections in the direction of rotation of the separators, thereby preventing grain falling into the separators from being thrown broadcast therefrom under rotation thereof, said conveyors travelling at different speeds to impart a rolling and grinding action to the grain therebetween.

AUGUST ANDERSON.